United States Patent
Sang et al.

(10) Patent No.: US 9,298,934 B1
(45) Date of Patent: Mar. 29, 2016

(54) MANAGING PRESENTATION OF ONLINE CONTENT

(71) Applicant: LinkedIn Corporation, Mountain View, CA (US)

(72) Inventors: Lifeng Sang, San Jose, CA (US); Vlad Schlosberg, San Francisco, CA (US); Sahil Handa, Santa Clara, CA (US); Pedro Oguri, Mountain View, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 14/755,893

(22) Filed: Jun. 30, 2015

(51) Int. Cl.
| | |
|---|---|
| *G06F 21/60* | (2013.01) |
| *G06F 17/30* | (2006.01) |
| *H04L 29/06* | (2006.01) |
| *H04L 29/08* | (2006.01) |

(52) U.S. Cl.
CPC ........ *G06F 21/604* (2013.01); *G06F 17/30424* (2013.01); *G06F 17/30867* (2013.01); *H04L 63/105* (2013.01); *H04L 67/2842* (2013.01)

(58) Field of Classification Search
CPC ............ G06F 21/604; G06F 17/30867; G06F 17/30424; G06F 17/30864; G06F 2221/2141; H04L 63/105; H04L 67/2842; H04L 63/10; H04L 63/102; H04L 51/12; H04L 9/3236; G06Q 50/01
See application file for complete search history.

(56) References Cited

U.S. PATENT DOCUMENTS

| | | | | |
|---|---|---|---|---|
| 7,248,691 | B1* | 7/2007 | Pandit | H04L 9/0643 380/273 |
| 8,301,650 | B1* | 10/2012 | Oliver | G06F 17/30492 707/758 |
| 8,499,355 | B1* | 7/2013 | Goncharov | G06F 21/44 726/25 |
| 9,021,265 | B1* | 4/2015 | Chen | H04L 9/0844 713/169 |
| 2005/0131961 | A1* | 6/2005 | Margolus | G06F 17/30097 |
| 2006/0098585 | A1* | 5/2006 | Singh | H04L 63/1416 370/252 |
| 2007/0260602 | A1* | 11/2007 | Taylor | G06F 19/22 |
| 2008/0313723 | A1* | 12/2008 | Naono | H04L 9/321 726/7 |

(Continued)

*Primary Examiner* — Darren B Schwartz
(74) *Attorney, Agent, or Firm* — Hickman Palermo Becker Bingham LLP (57) ABSTRACT

A method and apparatus for selectively publishing user-provided content items to other users is provided. In some instances, the content items are excluded from being rendered to a user according to one or more blocks that block the user from viewing content items provided by certain members. Managing blocks and excluding content is more efficiently achieved through the implementation of a Bloom filter that contains the blocked pairs of users. The Bloom filter can, using few computing resources, be queried to determine if a block does not exist between two users. If the Bloom filter returns an indication that a block might exist, the apparatus determines if a block is stored in an LRU cache of recently retrieved blocks. If the LRU cache does not identify a block, then a call to retrieve one or more blocked pairs is made to a data storage.

20 Claims, 6 Drawing Sheets

(56) References Cited

U.S. PATENT DOCUMENTS

| | | | |
|---|---|---|---|
| 2009/0016255 A1* | 1/2009 | Park | H04W 8/005 370/312 |
| 2009/0182726 A1* | 7/2009 | Wang | G06F 17/30979 |
| 2010/0216434 A1* | 8/2010 | Marcellino | H04W 36/385 455/412.2 |
| 2010/0228701 A1* | 9/2010 | Harris, III | H04L 51/12 707/683 |
| 2011/0035805 A1* | 2/2011 | Barkan | G06F 21/10 726/26 |
| 2011/0087779 A1* | 4/2011 | Martin | H04L 12/2602 709/224 |
| 2011/0320538 A1* | 12/2011 | Ickman | G06F 9/542 709/206 |
| 2012/0246301 A1* | 9/2012 | Vyrros | H04L 45/745 709/224 |
| 2012/0317222 A1* | 12/2012 | Almeida | G06Q 10/107 709/206 |
| 2013/0031367 A1* | 1/2013 | Mao | H04L 63/0407 713/168 |
| 2015/0150075 A1* | 5/2015 | Vahlis | G06F 21/602 726/1 |

* cited by examiner

MANAGING PRESENTATION OF ONLINE CONTENT

TECHNICAL FIELD

The present disclosure relates to computer data processing and, more specifically to, managing presentation of content items to users in an online social network.

BACKGROUND

In online social networks, members can post content items for presentation to other members. Typically, members receive only the content items posted by members that they have approved of in some way such as by accepting an invitation. The posts can have a variety of formats, including content items such as a user profile, a user status, content items shared by the user, comments by the user on content items posted by another user, and connections, links, or friendships between users. Different social networks can receive, manage, and present, different content items formats among their respective members.

In some social networks, a member can block other members from viewing content items posted by the blocking member. Further, the blocking member is blocked from accessing or viewing content items posted by the blocked members. A member might desire to block the blocked member for a variety of reasons such as the blocked member posting too much content items, the blocked member posting content items that the member finds distasteful, or the member simply not wanting to pursue a connection with the blocked member. Additionally, in some social networks, a first member "defriending" (or removing) a second member as a connection is not sufficient to block the second member's content from being presented to the first member and/or to block the first member's content from being presented to the second member.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In a social network, users can connect with other users in a number of ways. For example, some social networks allow users to create personal networks including friends, professional connections, family, and/or other acquaintances. In some social networks, users can subscribe to content items published by other users. In social networks, some users can block other users from viewing published content items and can block other user's content items from being presented to them. Thus, to a blocked user, the blocking user and his content items are not visible on the social network. The blocked user and the blocking user are together referred to as a blocked pair. Other users, however, can still view and interact with the blocked user's content items.

When a user visits a social networking site, the user is presented with content items published by other users. The other users can be within the user's personal network or outside the user's personal network. For example, the user may be presented with content items published by a second degree connection (e.g., a friend of a friend). Typically, users do not object to viewing content items published by people outside of their social network. However, a user may object to another user or content items posted by the other user of the social network and request that the social network block the user. Once the user is blocked, no content items posted by the user is provided to the other user in the blocked pair.

Due to the sheer number of users in the social network and that users can each have more than one hundred connections, checking for blocked users when rendering pages in the social network can be require large amounts of computational resources such as computing resources, memory resources, and network resources. To illustrate, each page presented to the user can include hundreds of user-submitted content items, each submitted by different users. When rendering a page, the author of each content item and the user for whom the page is rendered is compared to a list of blocked pairs. Because a page can include a great number of content items, this process is repeated hundreds of times, each resulting in a database hit. Additionally, some content items may be selected for a particular member because the author of the content item is a friend of a friend of a friend of the particular member. A determination should be made regarding whether the particular member blocked, not only the author of the content item, but also any of the "intermediate" friends between the author and the particular member. To reduce the number of database hits, a Bloom filter is used to store the blocked pairs. The Bloom filter results in no false negatives that can cause content items provided by a blocked user to be shown, requires less memory, and can be quickly queried.

System Overview

Figure 1:
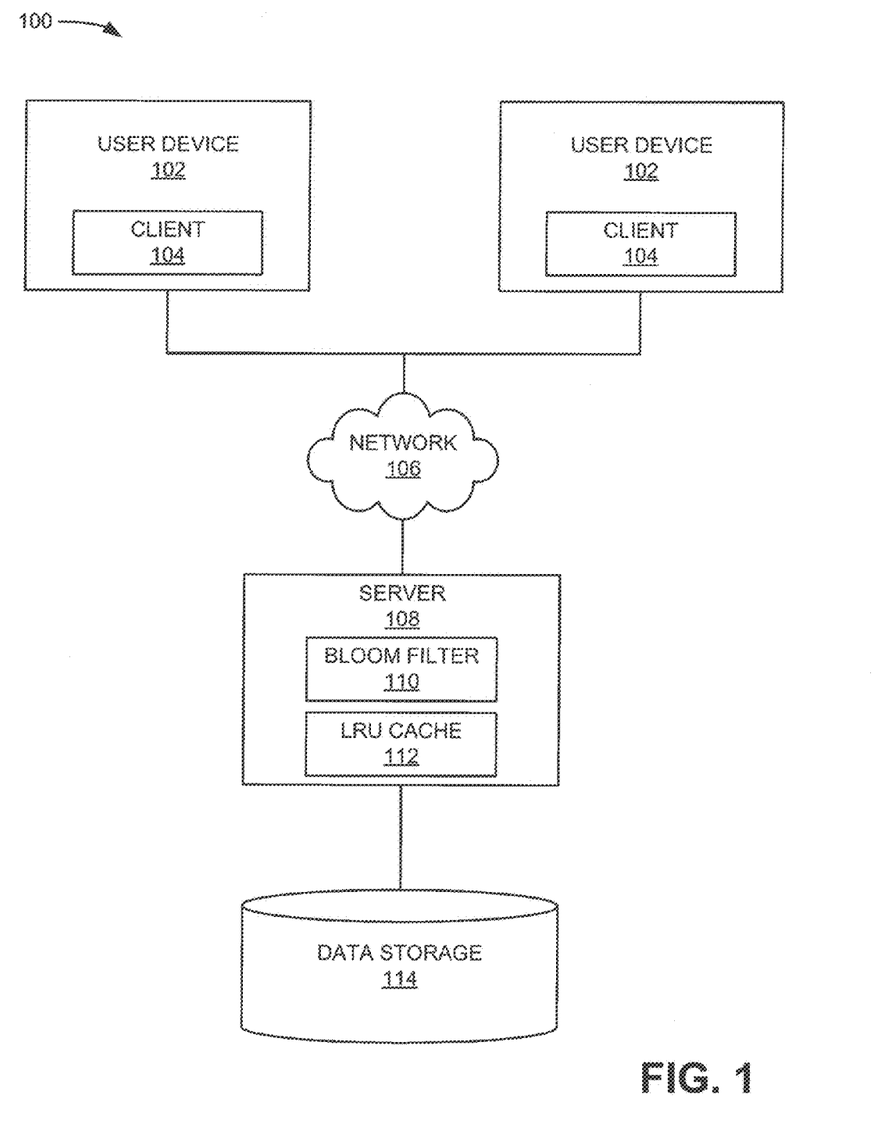
FIG. 1 is a diagram of a system for providing an online social network, according to some embodiments.

FIG. 1 is a diagram of a system 100 for providing an online social network, according to some embodiments. System 100 is a computer-based system. The various components of system 100 are implemented at least partially by hardware at one or more computing devices, such as one or more hardware processors executing instructions stored in one or more memories for performing various functions described herein. System 100 illustrates only one of many possible arrangements of components configured to perform the functionality described herein. Other arrangements may include fewer or different components, and the division of work between the components may vary depending on the arrangement.

System 100 includes one or more user devices 102A and 102B running clients 104A and 104B, a network 106, a server 108, and data storage 114. Each of the user devices 102A and 102B, server 108, and data storage 114 is in wired or wireless communication with the network 106.

User devices 102A, 102B comprise computing devices, including but not limited to, work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Each of the user devices 102A, 102B includes clients 104A, 104B. Clients 104A, 104B include, but are not limited to, applications such as a web browser, software, and/or other executable instructions to facilitate various aspects of the techniques described herein. Clients 104A, 104B may also include additional applications or other interface capabilities to communicate with the server 108 and/or data storage 114. User devices 102A, 102B may, depending on the embodiment, be located geographically dispersed from each other. Although two user devices 102A, 102B are shown in FIG. 1, more or less than two user devices 102A, 102B may be included in system 100.

Network 106 comprises a communications network, such as a local area network (LAN), a wireless LAN (WLAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), a cellular network, or a combination of two or more such networks. When network 106 comprises a public network, security features (e.g., VPN/SSL secure transport) may be included to ensure authorized access within system 100.

Server 108 comprises one or more servers, computers, processors, database servers, and/or computing devices configured to communicate with the data storage 114 and/or user devices 102A, 102B via network 106. Server 108 hosts one or more applications, websites, social networks, or other visual or user interface mechanisms related to techniques and data described in detail below. Server 108 may be located at one or more geographically distributed locations. Although one server 108 is shown in FIG. 1, system 100 may, depending on the embodiment, comprise one, two, or any number of servers 108, which may work alone and/or collectively to provide the functionality described herein.

The server 108 comprises Bloom filter 110 and Least Recently Used (LRU) cache 112. The Bloom filter 110 is a Bloom filter used to store records of blocked users for fast retrieval, as described below. The LRU cache 112 can store blocked pairs for a limited period of time when a page is being rendered. The Bloom filter 110 and LRU cache 112 are described below.

Data storage 114 comprises one or more databases or storage devices configured to store and maintain user profiles, data associated with user profiles, data associated with use of or access to user profiles, data derived from user profiles, and/or instructions for use by server 108 and/or clients 104A, 104B as described herein. Data storage 114 may, in some embodiments, be located at one or more geographically distributed locations relative to server 108. Server 108 and/or clients 104A, 104B may, in some embodiments, access data storage 114 via network 106. Alternatively, server 108 may access data storage 114 without use of network 106. As another alternative, data storage 114 may be included within server 108. System 100 may, depending on the embodiment, comprise one, two, or any number of data storages 114 configured to individually and/or collectively store the data described herein.

Blocking of Users

Figure 2:
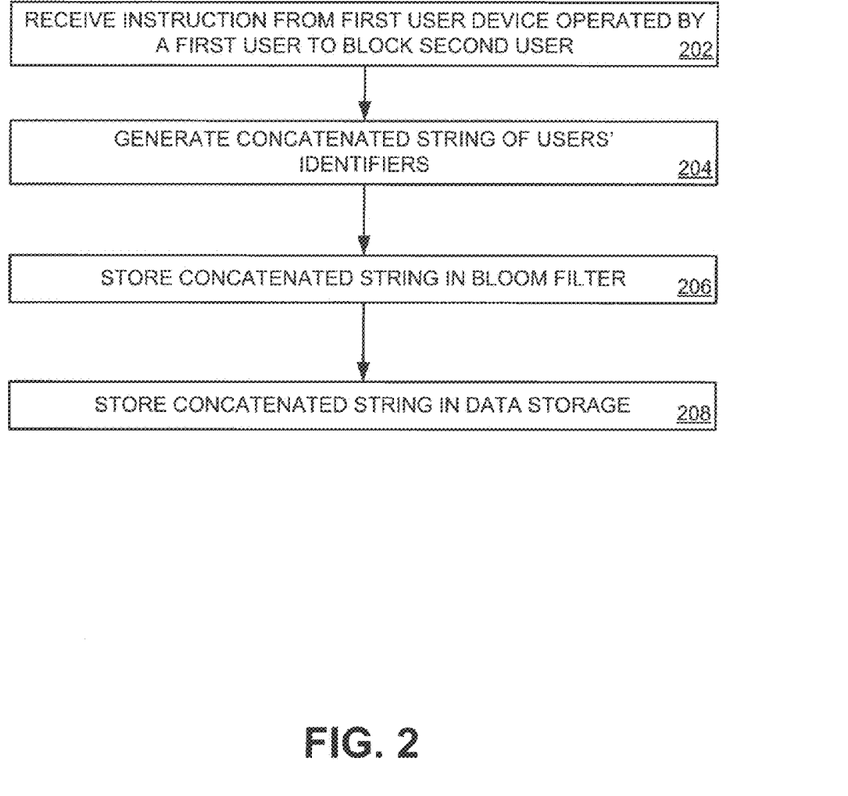
FIG. 2 is a flowchart of a method to add a blocked user to a bloom filter, according to some embodiments.

FIG. 2 is a flowchart of a method 200 to add a blocked user to a bloom filter, according to some embodiments. The method 200 can be performed by the server 108. The method 200 facilitates adding a blocked pair to a Bloom filter 110. At some future point in time when rendering a page, the server 108 can query the Bloom filter 110 to identify whether two users constitute a blocked pair. The addition of the blocked pair to the Bloom filter 110 results in fewer calls made to the data storage 114. Calling the data storage 114 is a computationally expensive process and reducing the number of calls can result in better performance of the server 108.

In an operation 202, the server 108 receives an instruction from a first user device 102A operated by a first user to block a second user. By blocking the second user, the first user will no longer be able to view content items posted by, and/or commented on by, the second user, including a profile of the second user and, optionally, a listing of other users who are connected with the second user. Additionally or alternatively, by virtue of the first user blocking the second user, the second user will no longer be able to view content items posted by the first user, including a profile of the first user and a listing of other users who are connected with the first user.

Figure 3:
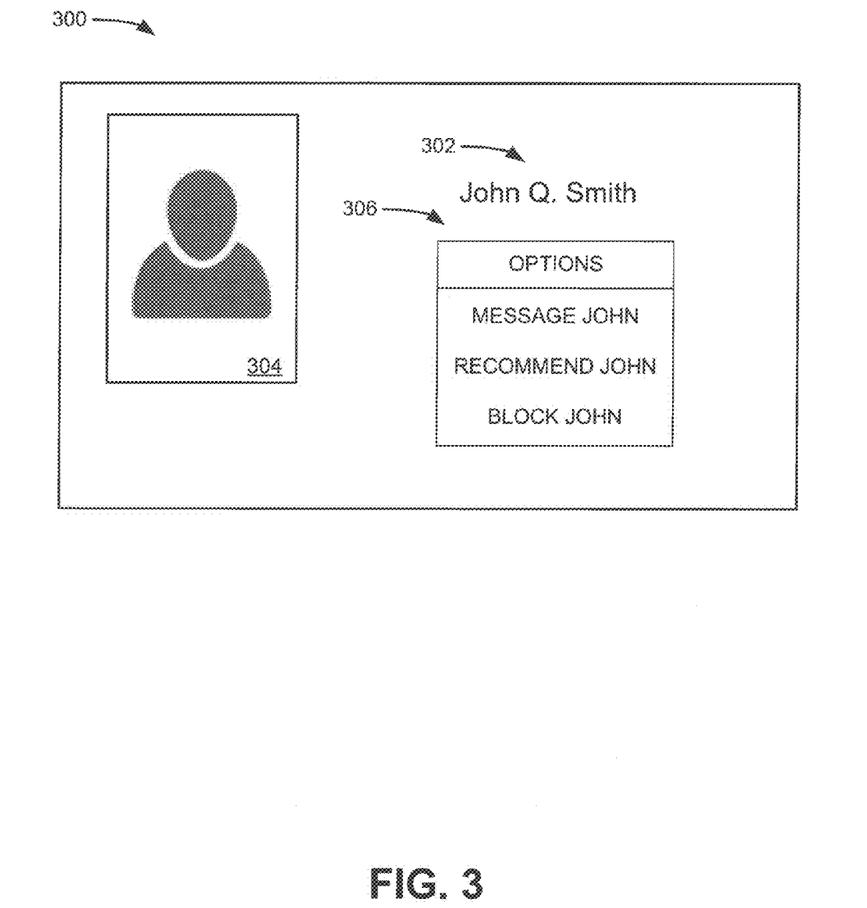
FIG. 3 depicts a portion of a user interface comprising an option to block a user, according to some embodiments.

FIG. 3 depicts a portion of a user interface 300 comprising an option to block a user, according to some embodiments. The client 104A on the user device 102A presents the user interface 300 to the user. The instruction of operation 202 can be received via the user interface 300. The user interface 300 comprises a presentation of a user profile of a second user, John Q. Smith. The user profile comprises the name 302 of the second user, an optional photo 304 of the user, and a menu 306 of options from which the first user can select.

As depicted, the menu 306 comprises an option to message John, an option to recommend John to other users, and an option to block John. In other embodiments, the menu 306 can include more or fewer options for interacting with John. For example, users can be given additional options such as, but not limited to, following John, subscribing to content items posted by John, subscribing to content items commented on by John, subscribing to content items "liked" by John, connecting to John, joining a group managed by John, and other ways of interacting with John or content items with which John interacted.

In some instances, the option to block John can be presented outside of a menu, such as appearing as a button in a dedicated location on John's profile page. In other instances, an option to block John can appear on other web pages hosted by the social network, such as a messaging page, a feed of content items presented to the first user, or a group or event page within the social network.

In some instances, when the option to block John is selected, a prompt to confirm that John be blocked by the first user is presented to the first user. Upon receiving the confirmation, the process 200 continues to operation 206.

In the social network, each user is identifiable via a numerical user identifier assigned to the user when the user first registered with the social network. Each of the first and second user has a unique identifier. The unique identifiers can be stored in the data storage 114 and retrieved by the server 108. In some embodiments, the data storage 114 has two columns, one for the user identifier of the member who initiated the block and the other for the user identifier of the member who was blocked.

Referring back to operation 206 of FIG. 2, in some embodiments, the retrieved identifiers are compared to determine which of the two identifiers has a lower numerical value. For example, user identifier 123456789 has a lower numerical value that user identifier 987654321. The server 108 orders the user identifiers such that the user identifier having the lower numerical value is ordered before the user identifier having the higher numerical value, regardless of which user initiated the block. Once ordered, the user identifiers are concatenated into a single string. Continuing the above example, the server generates the concatenated string "123456789987654321".

Because the user identifiers are ordered in the same way for the blocks, the blocks are bi-directional, meaning that neither user can see content items provided by the other. In some embodiments, it may be desirable to order the retrieved user identifiers of the users in the blocked pair based on which user initiated the block. This ordering can be used to facilitate one-directional blocks where the blocker can still view content items with which the blocked user interacts or content items with which the blocked user interacts are not presented to the blocker. For example, if user 123456789 initiated the block, the concatenated string is 123456789987654321; and if user 987654321 initiated the block, the resulting concatenated string is 987654321123456789.

Figure 4:
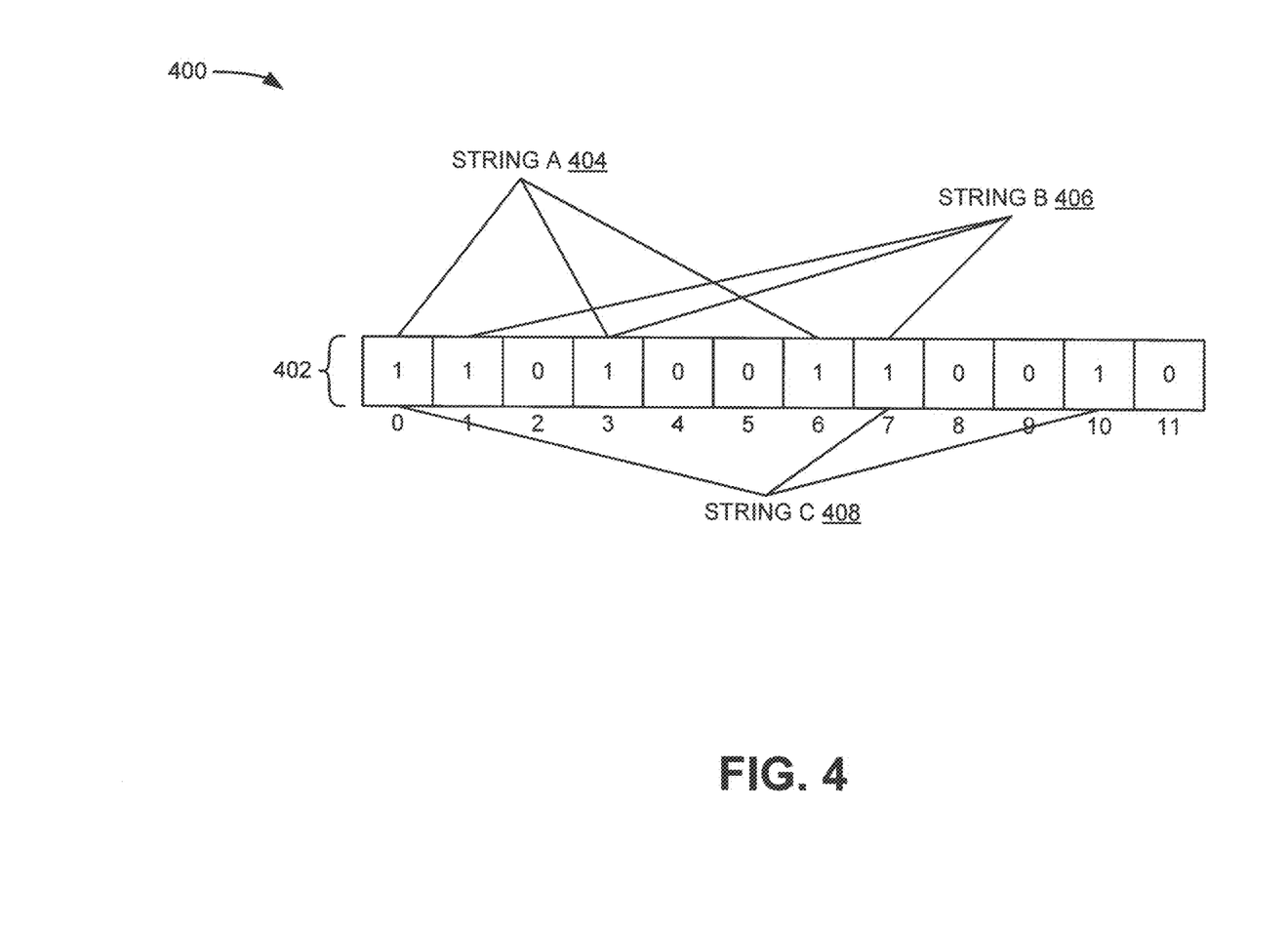
FIG. 4 is an example of a Bloom filter, according to some embodiments.

In operation 206, the server 108 stores the concatenated string in a Bloom filter. FIG. 4 is an example of a Bloom filter 400, according to some embodiments. A Bloom filter is a space-efficient probabilistic data structure that is used to test whether an element is a member of a set. In a Bloom filter, false positive matches are possible, but false negatives are not. In other words, a query returns either "maybe" being in the set of blocked users or "not" in the set of blocked users. Concatenated strings can be added to the set, but not removed without regenerating the Bloom filter. The probability of false positives increases as more concatenated strings representing blocks are added to the set. An empty Bloom filter is a bit array of m bits, all set to 0. For each Bloom filter, there are k different hash functions defined, each of which maps or hashes the concatenated string to one of the m array positions with a uniform random distribution. As such, the concatenated string is hashed k number of times and is mapped to k different array positions.

For example, as depicted in FIG. 4, a bit array 402 has 12 bits. In actual implementations that support millions of blocked pairs, a bit array can comprise millions of bits. In FIG. 4, each concatenated string, representing a blocked pair, is hashed three times, using a different hash function each time. As such, concatenated string A 404 is hashed three times, resulting in bits at positions 0, 3, and 6 being set to 1. Using the same three hash functions, concatenated string B 406 is hashed three times, resulting in bits at positions 1, 3, and 7 being set to 1. Note that once a bit is set to one, it remains set at 1. Subsequent hashing resulting in the same bit position do not reset or change a bit already set to 1. Likewise, concatenated string C 408 is hashed using the same hash functions, resulting in bits at positions 0, 7, and 10 being set to 1. When a new instruction to block a member is received, the identifiers are concatenated, hashed using the same hash functions, and, if necessary, up to three additional bits are set to one.

Referring back to FIG. 2, the concatenated string of the users' identifiers is hashed using the different hash functions. The number of hash functions that are used may be selected by an administrator based on the desired false positive rate of the Bloom filter, and the amount of available memory and processing power. As described in connection with FIG. 4, one or more bits in the Bloom filter bit array 402 are set to 1, indicating that a user pair is maybe a blocked pair.

In an operation 208, the concatenated string (or some other association between the blocked pair) is stored in the data storage 114. The concatenated string or the individual user identifiers stored in association with one another can be stored in the data storage 114 with additional metadata, such as a timestamp indicating when the instruction to block was received, an indication of which user initiated the block, a count of a number of times either user has been blocked, or other data.

In some embodiments, the user who requested that another user be blocked can submit an instruction to remove the block using the client 104A of the client device 102A. The respective identifiers of the blocked users are retrieved from the data storage 114. The Bloom filter 110 is regenerated with concatenated strings corresponding to other blocks still in force but without the concatenated strings corresponding to the removed block. The Bloom filter 110 can be regenerated on request or when an administrator-defined threshold is met. Examples of thresholds may include a number of removal requests received, a number of blocks maintained in the Bloom filter, or a period of time has elapsed.

Rendering of Content Items

Figure 5:
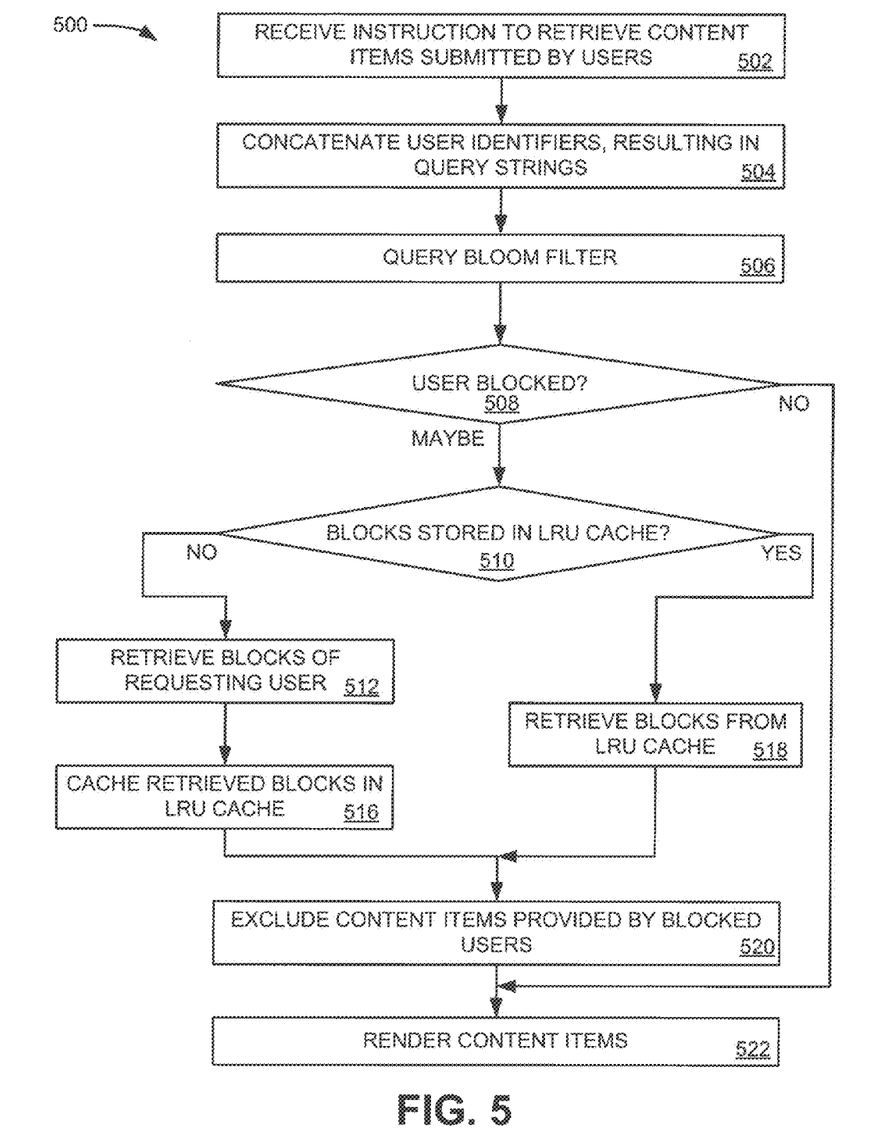
FIG. 5 is a flowchart of a method of retrieving content items from a plurality of users for display to a blocked user, according to some embodiments.

FIG. 5 is a flowchart of a method 500 of retrieving content items from a plurality of users for display to a user, according to some embodiments. The method 500 is performed when content items are displayed (or otherwise presented) to the user. The content items can be displayed as part of a feed associated with the user. The method 500 is performed to exclude content items associated with a blocked user from the content items rendered at the client 104A of the user device 102A.

In an operation 502, the server 108 receives an instruction to retrieve content items from the client 104A at the user device 102A. The instruction can be generated based on a user navigating to the webpage of the social network using a web browser or the user opening a social network application. In some instances, the user can navigate within the client 104A to particular content items, such as a particular post or set of comments.

In an operation 504, for each content item retrieved in response to the request of operation 502, the user identifier of the posting user and the user identifier of the requesting user are concatenated, resulting in a query string. Because the retrieved content items are received from a plurality of users, a plurality of query strings are generated. The strings may comprise the user identifier having a lower numerical value followed by the user identifier having the higher numerical value. Operation 504 may be repeated for each content associated with the content item, such as comments on a content item or "likes" of another content item. For example, a first user may have posted a content item, a second user may have added an associated content item by commenting on the content item, and a third user may have added a third content item by virtue of having "liked" the content item. Thus, for a single content item, multiple query strings corresponding to associated content items may be generated.

In an operation 506, server 108 queries the Bloom filter 110 for each query string of the plurality of query strings. The Bloom filter 110 contains the blocked pairs in the social network. To query for a particular blocked pair, the query string is fed to each of the k hash functions to get k array positions. If any one of the bits at these positions is 0, the query string is definitely not in the set. If query string is in the set, then all the bits would have been set to 1 when the string was inserted. If all of the elements are 1, then either the query string corresponds to a blocked pair, or the bits have by chance been set to 1 during the insertion of other concatenated strings resulting in a false positive.

In an operation 508, the result of the query is evaluated to determine if the user-pair is a blocked pair. If not (e.g., if any bit is still 0), the method 500 proceeds to operation 522 where the content items posted by the other users are rendered at the user device of the requesting user.

If the user-pair may be a blocked pair (e.g., all of the bits are set to 1), the method 500 continues to operation 510 to determine if the Bloom filter 110 has returned a false positive. Depending on how the Bloom filter 110 is set up, the Bloom filter 110 can return a false positive as approximately 10% of all positive results. In an operation 510, the server 108 determines whether the query string is stored in the LRU cache 112.

The LRU cache 112 is maintained by the server 108 in memory separate from the data storage 114. The LRU cache 112 may be maintained in a faster, and more expensive memory than memory included in the data storage 114. The LRU cache 114 stores one or more query strings that correspond to blocked pairs stored in the data storage 114 for a limited period of time. The period of time may be selected by an administrator based on the amount of time it typically takes the server 108 to render the content items at the user device 102A.

If the query string is not stored in the LRU cache 112, in operation 512, at least a portion of the blocks including the requesting user (such as where the user has been blocked by another user or where the user has blocked another user) are retrieved by the server 108 from the data storage 114. Because this operation involves reading from data storage 114, this operation consumes more computer resources and time than the other operations. In some embodiments, once one query string is identified as possibly being blocked by the Bloom filter 110, the server 108 may retrieve from the data storage 114 all of the blocked pairs that include the user. Because the data storage 114 is not limited to storing all of the blocked pairs as concatenated strings, the data storage 114 can retrieve the blocks according to just the requesting user's identifier. The server 108, upon obtaining the blocks from the data storage 114, can generate concatenated strings of the users' identifiers as described herein.

In an operation 516, the server 108 caches the concatenated strings (or other data identifying the blocked pair) in the LRU cache 112. The LRU cache 112 stores the blocks for a limited period of time, such as 1 second, 5 seconds, 10 seconds. The LRU cache 516 can cache blocked pairs corresponding to a plurality of requesting users who are accessing the social network at approximately the same time. The LRU cache 112 deletes, or writes over, cached blocked pairs (which can be stored as concatenated strings) that are the least recently used in favor of more recently retrieved blocked pairs.

In some embodiments, a separate pre-cache memory is maintained from the LRU cache 112. The pre-cache memory is dedicated to storing blocked pairs comprising users who are included in a number of blocked pairs. For these blocked pairs, too many calls are made to the data storage 114, slowing down the social network. By caching these blocks separately, they can be accessed more quickly. Some of these users are celebrities whose content items can be auto-populated into user's feeds of content items. To be included in the pre-cache memory, the user has been blocked a threshold number of times, such as 10, 50, 100, or 1,000 times. An administrator can set the threshold to be included in the separate cache. In these embodiments, further operations are performed to check for blocks in the pre-cache memory and to exclude content items posted by the blocked user.

Returning to operation 510, if one or more blocks including the requesting user are stored in the LRU cache 112, the server 108 retrieves the blocked pairs from the LRU cache 112. The blocked pairs in the LRU includes the blocked pairs that include the user.

In an operation 520, the server 108 excludes content items from blocked users from retrieved content items that is rendered to the user. The content items can be filtered out according to the user identifier of the blocked user.

In an operation 522, the content items from unblocked users are rendered. The content items can be rendered as part of a feed of content items, as an article or blog post having one or more comments associated with it, or as another form of web content items. The rendered content items do not include content items from users who are blocked from the viewing user.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
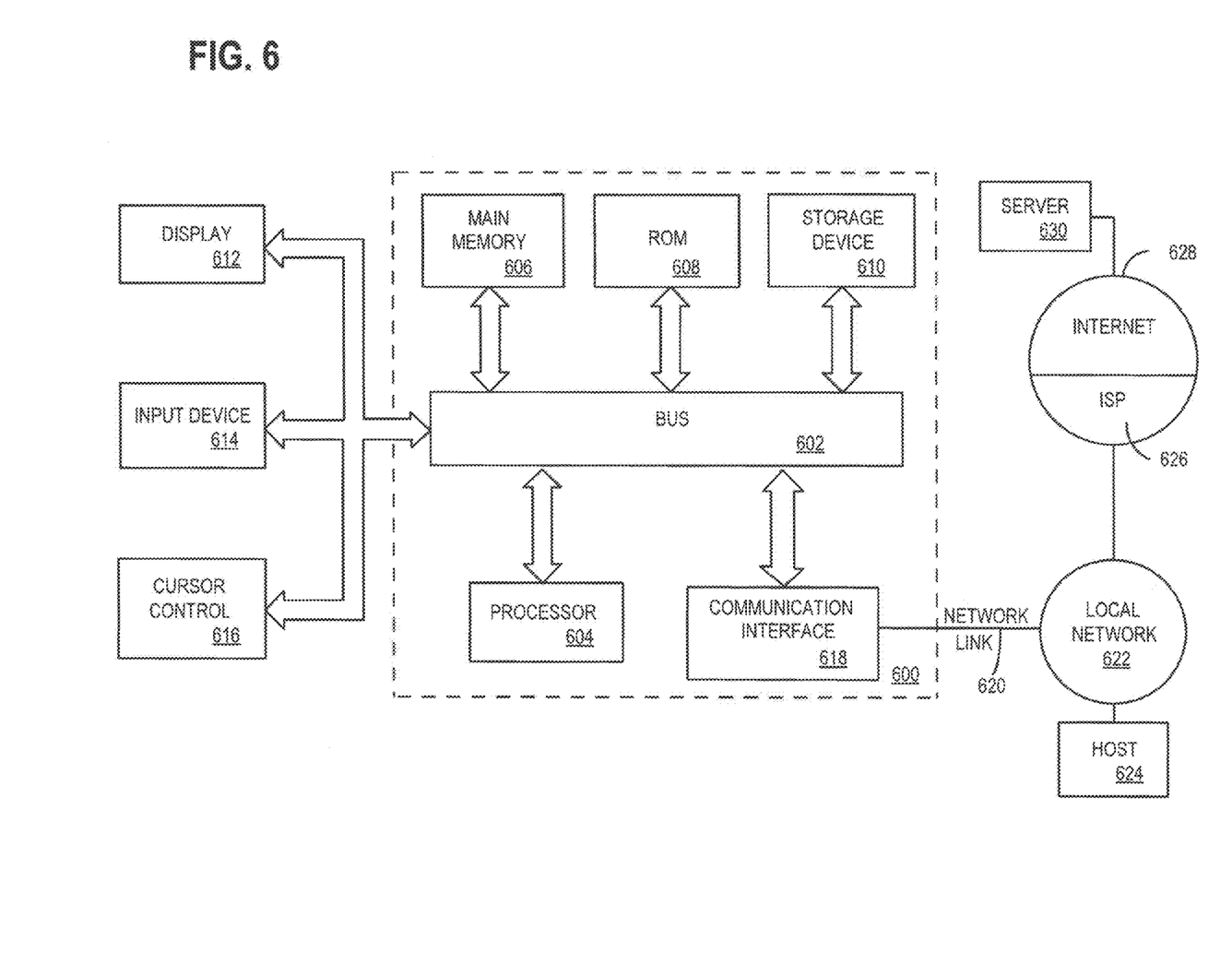
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, via a network from a user device operated by a first user, an instruction to block a second user such that content items associated with the second user are not presented to the first user;
   accessing, from a memory, a first identifier of the first user and a second identifier of the second user;
   concatenating the first identifier and the second identifier, resulting in a concatenated string;

updating a Bloom filter based on the concatenated string;
retrieving a plurality of content items associated with a plurality of users for presentation to the first user, the retrieved content items comprising one or more content items associated with the second user;
concatenating the first identifier and respective identifiers of the plurality of users resulting in a plurality of concatenated strings, the respective identifiers including the second identifier;
based on results of queries comprising the plurality of concatenated strings to the Bloom filter, determining that the first user is blocked from receiving content items associated with the second user;
identifying, within the plurality of content items, the one or more content items associated with the second user;
based on the one or more content items that were identified, preventing the one or more content items associated with the second user from being displayed on a graphical user interface of the user device of the first user;
wherein the method is performed by one or more computing devices.

2. The method of claim 1, further comprising performing at least one hash function on each string of the plurality of concatenated strings before storing a result of the at least one hash function in the Bloom filter.

3. The method of claim 1, wherein determining that the first user is blocked from receiving content items associated with the second user comprises:
receiving, from the Bloom filter, an indication that the concatenated string is possibly stored in the Bloom filter;
accessing, from the memory, a record indicating that the first user is blocked from receiving content items associated with the second user.

4. The method of claim 3, further comprising:
storing, in a cache memory, the record indicating that the first user is blocked from receiving content items associated with the second user.

5. The method of claim 1, further comprising:
concatenating the second identifier and respective identifiers of the plurality of users resulting in a plurality of strings, the respective identifiers including the first identifier;
querying the Bloom filter for the plurality of strings;
based on results of queries to the Bloom filter, determining that the second user is blocked from receiving content items associated with the first user;
identifying the content items provided by the first user within the retrieved content items;
rendering the retrieved content items at a user device of the second user except for the content items associated with the first user.

6. The method of claim 1, further comprising:
pre-caching, in a pre-cache memory, a set of user identifiers associated with a set of users who have each blocked a third user, the set of user identifiers comprising the first identifier of the first user, and
querying the pre-cache memory;
determining that the first user is blocked from receiving content items associated with the third user;
identifying the content items associated with the third user within the plurality of content items;
excluding the content items associated with the third user from the content items that are rendered at the user device of the first user.

7. The method of claim 1, further comprising:
receiving, from the user device operated by the first user, a second instruction to unblock the second user from viewing data of the first user;
accessing, from the memory, the first identifier of the first user and the second identifier of the second user;
re-generating the Bloom filter without the concatenated string.

8. The method of claim 1, wherein a first portion of the concatenated string comprises a lesser of the first identifier and the second identifier and a second portion of the concatenated string comprises a greater of the first identifier and the second identifier.

9. The method of claim 1, wherein the one or more content items associated with the second user comprise content items posted by the second user, content items comprising comments on another content item, and content items comprising likes of another content item.

10. A system comprising:
one or more processors;
non-transitory computer-readable storage media storing instructions which, when executed by the one or more processors, cause performance of:
receiving, via a network from a user device operated by a first user, an instruction to block a second user such that content items provided by the second user is not presented to the first user and content items provided by the first user is not presented to the second user;
accessing, from a memory, a first identifier of the first user and a second identifier of the second user;
concatenating the first identifier and the second identifier, resulting in a concatenated string;
storing the concatenated string in a Bloom filter and in a memory;
retrieving content items from a plurality of users for presentation to the first user, the retrieved content items comprising content items provided by the second user;
concatenating the first identifier and respective identifiers of the plurality of users resulting in a plurality of concatenated strings, the respective identifiers including the second identifier;
querying the Bloom filter for the plurality of concatenated strings;
based on results of queries to the Bloom filter, determining that the first user is blocked from receiving content items provided by the second user;
identifying content items provided by the second user within the retrieved content items;
based on the one or more content items that were identified, rendering the retrieved content items at a display device associated with the user device of the first user except for the content items provided by the second user.

11. The system of claim 10, wherein the instructions, when executed by the one or more processors, further cause performance of:
performing at least one hash function on each string of the plurality of concatenated strings before storing the string in the Bloom filter.

12. The system of claim 10, wherein determining that the first user is blocked from receiving content items provided by the second user comprises:
receiving, from the Bloom filter, an indication that the concatenated string is possibly stored in the Bloom filter;

accessing, from the memory, a record indicating that the first user is blocked from receiving content items provided by the second user.

13. The system of claim 12, wherein the instructions, when executed by the one or more processors, further cause performance of:
storing, in a cache memory, the record indicating that the first user is blocked from receiving content items provided by the second user.

14. The system of claim 10, wherein the instructions, when executed by the one or more processors, further cause performance of:
concatenating the second identifier and respective identifiers of the plurality of users resulting in a plurality of strings, the respective identifiers including the first identifier;
querying the Bloom filter for the plurality of strings;
based on results of queries to the Bloom filter, determining that the second user is blocked from receiving content items provided by the first user;
identifying the content items provided by the first user within the retrieved content items;
rendering the retrieved content items at the user device of the second user except for the content items provided by the first user.

15. The system of claim 10, wherein the instructions, when executed by the one or more processors, further cause performance of:
pre-caching, in a pre-cache memory, a set of user identifiers associated with a set of users who have each blocked a third user, the set of user identifiers comprising the user identifier of the first user, and
wherein rendering the retrieved content items at the user device of the first user further comprises:
querying the pre-cache memory;
determining that the first user is blocked from receiving content items provided by the third user;
identifying the content items provided by the third user within the retrieved content items;
excluding the content items provided by the third user from the retrieved content items rendered at the user device of the first user.

16. The system of claim 10, wherein the instructions, when executed by the one or more processors, further cause performance of:
receiving, from the first user, a second instruction to unblock the second user from viewing data of the first user;
accessing, from the memory, the first identifier of the first user and the second identifier of the second user;
re-generating the Bloom filter without the concatenated string.

17. The system of claim 10, wherein a first portion of the concatenated string comprises a lesser of the first identifier and the second identifier and a second portion of the concatenated string comprises a greater of the first identifier and the second identifier.

18. The system of claim 10, wherein the one or more content items associated with the second user comprise content items posted by the second user, content items comprising comments on another content item, and content items comprising likes of another content item.

19. A method comprising:
receiving, from a user device operated by a first user, a request to block content associated with a second user;
in response receiving the request:
combining a first identifier that identifies the first user and a second identifier that identifies a second identifier to create a combined identifier;
updating a Bloom filter based on the combined identifier;
identifying a plurality of candidate content items to present to the first user; for each content item of the plurality of candidate content items:
identifying a user identifier associated with said each content item;
combining the user identifier and the first identifier to create a particular combined identifier;
determining, based on the Bloom filter and the particular combined identifier, whether a user associated with said each content item might have been blocked by the first user;
if it is determined that the user associated with said each content item has not been blocked by the first user, then including said each content item in a set of content items to be presented to the first user;
if it is determined that the user associated with said each content item has been blocked by the first user, then excluding said each content item from the set of content items;
causing the set of content items to be displayed on a graphical user interface of the user device operated by the first user;
wherein the method is performed by one or more computing devices.

20. The method of claim 19, wherein the candidate content items comprise content items posted by the second user, content items comprising comments on another content item, and content items comprising likes of another content item.

* * * * *

UNITED STATES PATENT AND TRADEMARK OFFICE
CERTIFICATE OF CORRECTION

| | | |
|---|---|---|
| PATENT NO. | : 9,298,934 B1 | Page 1 of 1 |
| APPLICATION NO. | : 14/755893 | |
| DATED | : March 29, 2016 | |
| INVENTOR(S) | : Lifeng Sang et al. | |

It is certified that error appears in the above-identified patent and that said Letters Patent is hereby corrected as shown below:

Title page item (72) Inventors lines 1-2,

Please delete "Vlad Schlosberg" and insert --Vlad Shlosberg--.

Signed and Sealed this
Seventeenth Day of May, 2016

Michelle K. Lee
*Director of the United States Patent and Trademark Office*